May 29, 1956 J. G. MORAN 2,748,256
INFLATABLE ILLUMINABLE FIGURE
Filed Nov. 12, 1953 2 Sheets-Sheet 1
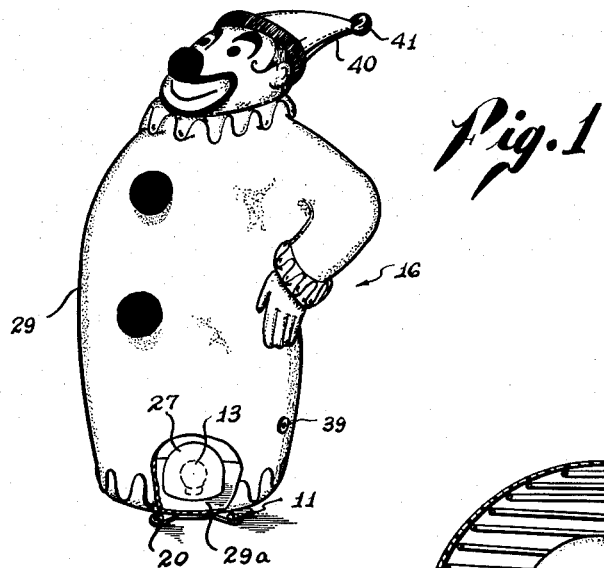
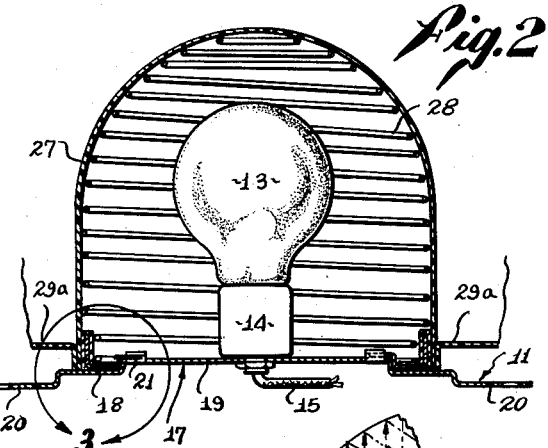
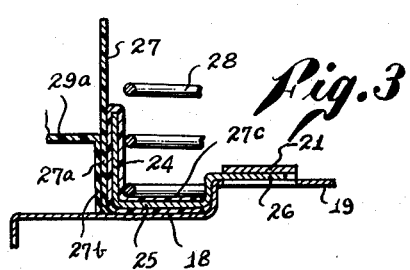
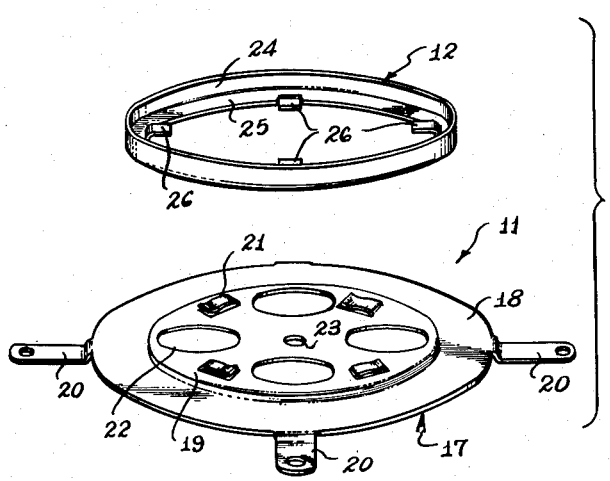
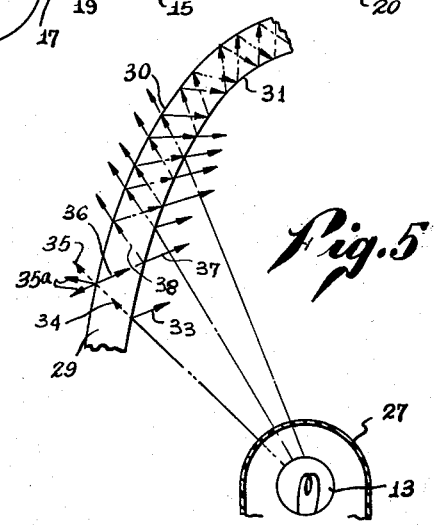
INVENTOR.
JAMES G. MORAN
BY George R. Bliss
Attorney May 29, 1956 J. G. MORAN 2,748,256
INFLATABLE ILLUMINABLE FIGURE
Filed Nov. 12, 1953 2 Sheets-Sheet 2
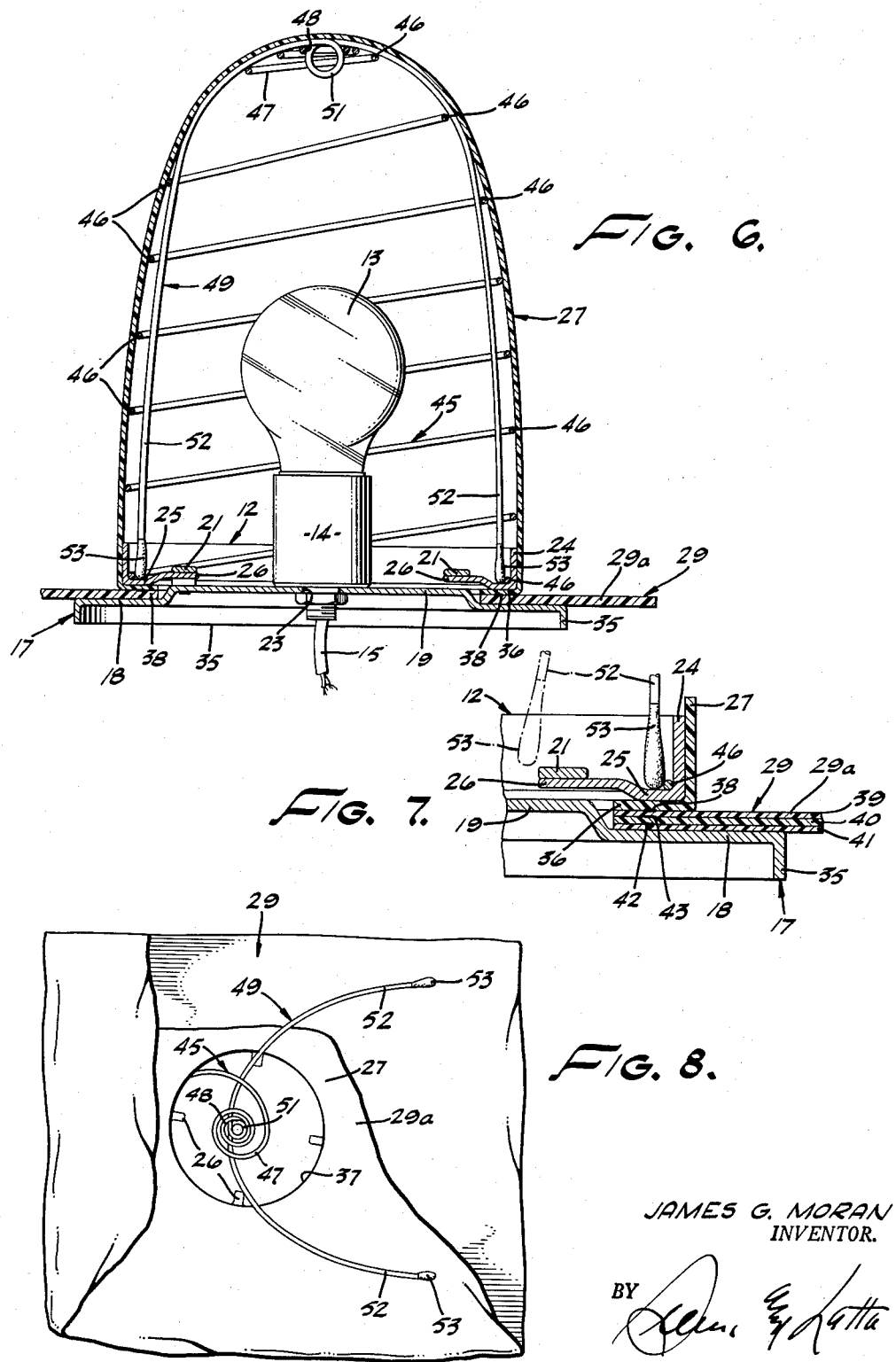
JAMES G. MORAN
INVENTOR.
ATTORNEYS

United States Patent Office 2,748,256
Patented May 29, 1956

2,748,256

INFLATABLE ILLUMINABLE FIGURE

James G. Moran, Burbank, Calif.

Application November 12, 1953, Serial No. 391,411

11 Claims. (Cl. 240—10)

This invention relates to illuminable, inflatable objects designed for visual attraction to amuse, entertain or advertise.

Inflatable objects and figures or rubber, plastic or other flexible material are in common use as toys, and amusement novelties, and for advertising products, services and business establishments. The quality of flexibility and consequent inflatability of the material lends itself well to inexpensive manufacture and to the production of a wide variety of shapes. Such material is also readily adapted to coloration and to the application of external decorations.

Artificial lighting is a means of major importance in enhancing the attention-attractive character, or the aesthetic appearance of such objects and figures. Lights directed from the outside, such as floodlights are used. Light sources placed within the interior of the object are also used. The present invention provides means for such interior lighting and of an improved character.

Some plastic materials of a translucent character have the quality of receiving light rays and reflecting them back and forth between the bounding surfaces of an object of the material. These rays then emerge through the external or bounding surfaces and are reflected in every direction. This effect is very pronounced when the plastic object is a relatively thin sheet of material. Obviously, since the light which is radiated finally from the plastic sheet is almost entirely reflected light, portions of a continuous sheet which are not in the direct path of rays of light from an artificial light source, are illuminated with almost equal brilliance as those portions which directly receive such light rays. The luminosity in effect travels in curves within the plastic sheet, following the curves of the sheet itself. The entire sheet, and a figure or object made of such a sheet, glows in every portion, whether near to or distant from the light, whether directly exposed to the light or hidden from the light by the conformation of the figure, and glows in just about the same degree of brilliance as though the plastic sheet were itself luminescent and a source of light.

This property of translucent plastic materials such as Vinylite, especially when in sheet form, is utilized in a novel manner in this invention to create a surprisingly beautiful and unusual effect when hollow inflatable sheeted figures of the material are lighted from within. As will be realized from a reading of the description of the invention and the accompanying drawings, the problem of internal lighting of an object of flexible material, which must also be inflatable and airtight despite the disposition of the lamp or other light source within it, is solved by the provision of a re-entrant chamber in the object, a chamber which is outside the inflation chamber and in which the lamp is mounted.

It is extremely important that the wall of the re-entrant chamber in the inflated object be supported in such a way that it will not be forced against the lamp by the air pressure in the object, since any contact or close adjacency between the lamp and the chamber wall would result in burning of the latter. It is also extremely important that the means for supporting the wall of the re-entrant chamber be readily collapsible to a relatively flat condition after deflation of the object and removal of the lamp, so that the object may be rolled up and stored in a small container during periods of nonuse. Further important requisites for an inflatable figure of the type indicated, and which are provided by the present invention, include means for effecting an adequate seal between the wall of the re-entrant chamber and the inflatable object surrounding it, and means to mount the suporting structure relative to the chamber and object walls.

In view of the above factors characteristic of the field of inflatable plastic objects of the type indicated, it is an object of the present invention to provide an inflatable object having a re-entrant lamp chamber the wall of which is supported by a combination of spring elements which are readily collapsed to a flat condition and may be rolled with the deflated object into a small and readily stored bundle.

Another object of the invention is to provide novel means for retaining the chamber wall-supporting structure in position, and for effecting the seal necessary to pervent the object from becoming deflated.

These and other objects and advantages of the invention will be more fully set forth in the following specification and claims considered in connection with the attached drawings to which they relate.

In the drawings:

Figure 1 is a perspective view of an embodiment of the invention selected to illustrate its nature and principles.

Figure 2 is a fragmentary vertical sectional view of the lower central portion of the embodiment shown in Figure 1, the illuminating facilities being shown in elevation.

Figure 3 is an enlarged view of that portion of Figure 2 shown within the circle designated by the numeral 3;

Figure 4 is an exploded perspective view of the supporting framework;

Figure 5 is a diagrammatic view showing the travel paths of light rays emanating from the lamp 13 and striking the material of the figure 16;

Figure 6 is a vertical central sectional view, corresponding generally to Figure 2 but illustrating the novel supporting structure of a second embodiment of the invention;

Figure 7 is an enlarged detail view of a lower edge portion of the structure illustrated in Figure 6; and Figure 8 is a bottom plan view illustrating the bag-supporting structure in a collapsed, flat condition and with the envelope deflated and in position for rolling.

The invention comprises in general a supporting framework, illuminating facilities, and an eye attracting object mounted upon the framework and illuminated by the said facilities.

The supporting framework consists of a stand 11 and a securing ring 12. The illuminating facilities consist of a light source such as the incandescent lamp 13, a support for the light source such as the socket fixture 14, and conducting means for supplying the light source with energy, such as the two conductor cable 15 as shown in Figure 2.

The eye attracting object is shown in the drawing as a flexible Vinylite inflatable envelope indicated generally at 16, shaped and exteriorly decorated to represent a clown.

The stand 11 consists of a plate 17 which is press-formed to provide a ring portion 18 and elevated central disc 19. It has a plurality of supporting feet 20 lying in a plane slightly below that of ring 18.

The central disc 19 is provided with tangentially directed tongues 21 struck from the disc 19 to lie in a plane parallel thereto and slightly thereabove. This disc is also provided with a plurality of annularly arranged lightening and ventilating holes 22 and a central hole 23 for the passage of the conductor cable 15 and the mounting and securement in place of the socket fixture 14.

The securing ring 12 is of angle section with an upstanding flange 24 and a horizontal flange 25. Short tongues 26 lying in a plane slightly above that of the flange 25 project inwardly from this flange and are of a number and disposition to simultaneously engage under the tongues 21 when the ring is placed concentrically on the stand and turned through a small angle relatively to the stand.

The first step in the manufacture and assembly of the several parts of the invention is the production of a Vinylite bag 27 for housing the lamp 13. This bag is prefabricated in any suitable manner. It is preferably of the shape of a beehive, having cylindrical side-walls and a dome shaped top. The material of this bag may be of a transparent nature instead of being translucent as above described.

The ring 12 is then sprayed with a thin coating of liquid Vinylite to provide on it a layer 27c. When the ring 12 is thus sprayed with liquid Vinylite the tongues 26 are masked to prevent their being coated.

The collapsed Vinylite bag 27 is then placed in position with its lower edge 27a surrounding and in contact with the Vinylite layer 27c on the ring flange 24. An inflatable Vinylite envelope 29 of a translucent nature, and having a centrally apertured bottom 29a, is then placed with the rim of its circular bottom aperture or opening surrounding and contacting the bag edge 27a. The circle of contact is preferably somewhat above the bottom of the bag 27, preferably at the level of the top portion of the flange 24, the bottom wall 29a of the envelope being turned downwardly to present a flange 27b which lies against the bag edge 27a. By an appropriate bonding process utilizing both heat and pressure, the layer 27c, the bag edge 27a and the flange 27b are integrally cemented. A helical spring 28 of coiled stiff wire is then compressed in diameter sufficiently to pass within the flange 25 and is inserted upwardly through the ring 12 and allowed to expand into contact with the Vinylite bag 27, holding it to its desired form as shown in Figure 2. It is to be noted that the upper portion of spring 28 is volute and upwardly convergent, to conform to the dome top of bag 27.

The lamp socket 14 with the lamp 13 in place therein, is then mounted in the hole 23 of the disc 19. The assembled Vinylite bag 27, envelope 29, and ring 12 are then centrally placed on top of the stand 11 and the stand is rotated until the tongues 26 slide under and engage the tongues 21 in a bayonet lock.

The envelope 29, as explained above, is bonded to the bag 27, which in turn is bonded to the ring 12, providing an air-tight chamber between the envelope 29 and the bag 27. This chamber may be placed under pneumatic compression and the envelope 29 inflated to form by injecting air through the inflating valve 39.

When the incandescent lamp 13 is lighted a striking and, to the average person, a startling result is obtained. The entire surface of the envelope 29 is brilliantly illuminated and every portion of the surface seems itself to be a source of light. Portions of the surface of the envelope 29, such as the cap 40 and tassel 41, are illuminated and glow with a brilliance which seems to the eye of the observer as great as those portions of the surface of the envelope 29 which are close to the lamp 13. The fact that direct straight lines from the lamp 13 to the tassel 41 are for a considerable distance entirely outside of the interior chamber of the envelope does not seem to modify or lessen the brilliance of the illumination of the tassel 41 and other similarly distanced points on the envelope; i. e. points which are not reached by any ray of light traveling directly to them from the lamp 13 across and within the envelope chamber. The disposition of an opaque object squarely between the tassel 41 and the lamp 13 at a point outside the envelope, in no wise dims the luminosity of the tassel.

Figure 5 illustrates graphically the reason for this uniform brilliance and seeming light giving character of each portion of the envelope whether the light travels directly from the lamp to each individual portion of the envelope or whether the light has to follow a curved path within the substance of the envelope to reach such portion.

Myriads of light rays, of course, emanate from the lamp 13. One such ray, the bottom one in Figure 5, is shown as striking the inner surface 31 of the envelope 29. The performance of this ray is identical with the performance of every other ray which leaves the lamp 13 and strikes this inner surface 31. The ray is in part reflected as shown at 33 and in part passes (at 34) through the translucent material of the envelope 29 and strikes the outer surface 30 of the envelope 29. There it is again partly reflected as shown at 36 and partly emerges exteriorly of the envelope 29 as shown at 35. Because of the translucent character of the material, other fainter rays 35a also leave the surface 30 at the point of incidence of the light 34 upon the outer surface 30.

Also because of the translucent character of the material, as the light ray 34 traverses the thickness of the envelope 29 it is to some extent broken up, and diffused light rays emanate in all directions from each point along its travel path through the envelope 29. The light ray 36 when it strikes the surface 31 also in part travels on into the interior chamber of the envelope as shown at 37 and in part is reflected back into the Vinylite wall as shown at 38. The ray 37 travels across the interior of the envelope and strikes the surface 31 at some other point on the other side of the envelope where similar actions occur.

It is apparent that the light rays are broken up into many secondary rays which in part follow around the substance of the Vinylite wall 29 in a curved path to render all portions of the envelope brilliantly illuminated; and that a secondary source of light rays appears to be initiated within the substance of the envelope itself.

Referring next to Figures 6, 7 and 8, a second embodiment of the invention is illustrated and which is particularly adapted to maintain the walls of the lamp enclosing bag in spaced relation from the lamp despite relatively high air pressure in the inflated envelope. It has been discovered that the helical coil spring alone is not always adequate to prevent the plastic bag from engaging the relatively hot lamp and becoming burned or punctured, with consequent leakage of air from the envelope. The structure illustrated in Figures 6, 7 and 8 is operative to prevent the bag from contacting the lamp, yet is readily collapsible to a relatively flat condition (Figure 8) so that the deflated envelope, with supporting springs and ring attached, may be rolled into a relatively small and readily stored bundle.

In the present embodiment the ring 12 is the same as in the previously described embodiment except that the Vinylite coating 27c is omitted. The stand 11, lamp 13, and socket fixture 14 are also the same as in the previous embodiment, except that the feet 20 of stand 11 are replaced by suitable corner projections, not shown, on ring 18 which is flanged at 35 for this purpose. All of these elements have, where appropriate, been given the same reference numerals as in the embodiment previously described.

The Vinylite bag, again designated by the reference numeral 27, is, in the present embodiment, provided at its lower edge or rim with a radially inwardly extending flange 36. The flange 36 is adapted to abut and be sealed to the horizontal bottom wall 29a of inflatable envelope 29. Bottom wall 29a has a circular central opening 37 therein, as indicated in connection with the previous embodiment, but is not provided with the flange 27b. Flange 36 and the inner rim of envelope bottom wall 29a are in flatwise engagement and are sealingly bonded to each other peripherally of opening 37 as indicated at 38 in Figures 6 and 7, preferably by a suitable heat process. The envelope bottom wall 29a is shown in Figure 6 as comprising but a single sheet of Vinylite or other suitable plastic material, while three separate sheets 39–41 are shown in Figure 7 and as bonded together at points 42 and 43. The multi-layer construction of Figure 7 has greater strength and wear resistance than the single sheet structure of Figure 6.

It is a feature of the present embodiment that there is no seal between the ring 12 and either the bag 27 or envelope 29. Instead, the ring 12 is freely movable within bag 27 unless held in place by the tangentially directed tongues 21 of plate 17 and which fit over, as previously described, the radially inwardly extending tongues 26 of the ring 12. When the tongues 21 and 26 are thus engaged as indicated at Figures 6 and 7, the flange 36 on bag 27 and the inner rim of envelope bottom wall 29a, and which together form a neck for the re-entrant chamber, are effectively clamped between ring flange 25 and plate ring portion 18. The thickness of the plastic neck thus clamped is such that the respective tongues 21 and 26 press tightly against each other to hold the supporting structure in a firmly assembled relationship. However, when the plate 17 is rotated to disengage the tongues 21 and 26, and the plate 17 with socket 14 and lamp 13 are removed through bottom opening 37, the ring 12 is freely movable in bag 27 unless retained in place by the spring elements next to be described.

Similarly to the previous embodiment, the transparent or translucent plastic bag 27 has a dome shape, and is supported in spaced relation relative to light bulb 13 by a helical spring 45 seated on flange 25 of ring 12. The spring 45 has rather widely spaced side volutions 46 which connect with an upwardly converging volute dome-supporting section 47, the latter being adapted to form a central upper opening 48. Spring 45 is such that it tends to assume the extended position illustrated in Figure 6 but may be collapsed or flattened to a position in the plane of ring 12 when it is desired to store the apparatus as will be described subsequently.

According to the present embodiment, the helical spring 45 and the bag 27 are selectively maintained in the extended position shown in Figure 6, or the collapsed condition shown in Figure 8, by a U-shaped or generally parabolic spring element 49 which is pivotally connected at its upper or closed end to the portion 47 of spring 45. The pivotal connection between U-shaped spring 49 and helical spring 45 preferably comprises a central loop 51 at the base of spring 49 and of a size to resiliently fit through the opening 48. The longitudinal or major axis of U-spring 49 is substantially the same length as the extended height of bag 27 above ring flange 25. However, the minor axis of U-spring 49, that is to say the distance between the end portions 52 of the arms of the spring, is substantially greater than the diameters of ring 12 and opening 37 when in a free and unrestrained condition as shown in Figure 8. It follows that in order to position the U-spring 49 interiorly of bag 27 as shown in Figure 6, the arm ends 52 must be shifted a substantial distance towards each other, an operation which is facilitated by the presence of loop 51. Preferably, in order to aid in maintaining the U-spring in its desired supporting position, the arm end portions 52 are provided with plastic tips 53 to effect a frictional seat on ring flange 25. These tips also protect the envelope from being pierced.

In the initial, or factory, assembly of the structure shown in the present embodiment, the ring 12 is inserted through opening 37 into the re-entrant chamber defined by bag 27. The helical spring 45 is then assembled with U-spring 49 by inserting the arms of the latter downwardly between the side volutions 46 and upwardly converging section 47 of the former. The loop 51 of U-spring 49 is then forced downwardly through opening 48 to effect a permanent pivotal connection. Thereafter, the assembled helical and U-springs are inserted through opening 37 and through the ring 12 to the position shown in Figure 6. When in this position, the arm ends 52 of U-spring 49 are bent substantially toward each other, and the end tips 53 are seated on the upper surface of ring flange 25 to hold the upper or base portion of the U at the elevation necessary to prevent bag 27 from collapsing under the effect of air pressure in the surrounding envelope 29. The bag is then held in its desired shape both by the U-spring 49 and the helical spring 45, and there is no danger that it will come into close adjacency with the lamp 13 and be burned or damaged.

When it is desired to store the structure, as distinguished from using it, the envelope 29 is deflated and base plate 17 rotated to disengage the respective tongues 21 and 26, after which the plate 17, socket 14 and lamp 13 are removed through opening 37. Alternatively, the last-mentioned elements may be used for a substitute inflated plastic figure and only the envelope 29, bag 27, springs 45 and 49, and ring 12 stored. To store the deflated envelope 29 together with its contained bag 27, springs and ring, the end portions 52 of the U-spring 49 are grasped and pulled toward each other until they are clear of flange 36, for example as shown in dashed lines in Figure 7. The U-spring 49 is then pulled downwardly through opening 37 to collapse bag 27 and compress helical spring 45 until it is in substantially the same plane as ring 12. It is to be noted that although the spring 45 tends to remain in extended position, it is prevented from so doing by the arms of U-spring 49 which spread apart after their removal from within bag 27 and abut the neck portion of envelope wall 29a, which in turn abuts ring 12, to resiliently prevent the helical spring 45 from becoming extended. The U-spring 49 is then pivoted about its pivotal connection with helical spring 45, comprising the loop 51 in opening 48, until it is in substantially the same plane as ring 12 and the compressed helical spring 45 as shown in Figure 8. All of the metallic elements then being in the same plane, they may be rolled with the deflated envelope 29 to provide a relatively flat, compact, and readily stored bundle of a size to be positioned in a small box.

With the described construction, an inflatable figure three and one-half feet high and having a base diameter of fifteen inches, and with a lamp chamber five inches high and five inches in base diameter, may be stored easily in a box one foot long, six inches wide, and two and one-half inches deep.

The present application constitutes a continuation-in-part of my co-pending application Serial No. 309,011, filed September 11, 1952, for an Inflatable Illuminable Figure, now abandoned.

While the particular apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In an ornamental device, a flexible light-permeable envelope having a flexible wall portion defining a re-entrant chamber therein, said envelope being inflatable to an ornamental shape, means to mount a lamp within said re-entrant chamber to interiorly illuminate the walls of said envelope, and means to maintain said flexible wall portion of said re-entrant chamber spaced from said lamp to prevent its burning and puncturing with consequent deflation of said envelope.

2. In an ornamental device, a light-permeable inflatable envelope, flexible and light-permeable wall means to define a re-entrant chamber in said envelope, said wall means being continuous with the walls of said envelope to prevent leakage of gas from said envelope, means to mount a light in said re-entrant chamber and in spaced relation relative to said wall means, and spring means to maintain said wall means spaced from said light despite the effects of pressure in said envelope.

3. The invention as claimed in claim 2, wherein said spring means comprises a helical spring having a shape corresponding to the shape of said wall means, said helical spring being disposed within said re-entrant chamber and serving to abut and support said wall means.

4. The invention as claimed in claim 3, wherein said spring means additionally comprises a generally U-shaped spring mounted in said re-entrant chamber together with said helical spring.

5. The invention as claimed in claim 4, wherein said U-shaped spring is pivotally connected at its base to said helical spring and is self-biased so that its arms will spring apart to resiliently hold said helical spring in compressed condition upon withdrawal of said U-shaped spring from said re-entrant chamber.

6. An inflatable and illuminable plastic object, which comprises a flexible translucent plastic envelope having an opening therein, a flexible light-permeable plastic bag disposed within said envelope and having its mouth registered with said opening, the relationship between said bag and envelope being such that said envelope is airtight, means to form a spring seat at said mouth of said bag, and a helical spring disposed within said bag and seated between said spring seat and the closed end of said bag to hold said bag in extended condition.

7. The invention as claimed in claim 6, wherein a generally U-shaped spring is provided in said bag, the ends of the arms of said U-shaped spring being seated on said spring seat, and the base of said U-shaped spring being positioned to support said closed bag end.

8. An inflatable and illuminable plastic object, which comprises a flexible translucent plastic envelope having an opening therein, a flexible light-permeable plastic bag disposed within said envelope and having its mouth registered with said opening and continuous with said envelope to make the latter air-tight, said bag being formed with a generally cylindrical side wall and with a dome-like end wall disposed remote from said opening, a relatively rigid ring mounted in said bag adjacent said opening, a helical spring disposed in said bag and seated on said ring, said spring having a cylindrical portion abutting said side wall and a volute convergent portion abutting said end wall, means to mount a light in said bag, and a U-shaped spring having its arms seated on said ring and its base in engagement with said volute portion of said helical spring, said U-shaped spring serving to support the volutions of said helical spring to prevent collapse of said bag into contact with said light.

9. The invention as claimed in claim 8, wherein the arms of said U-shaped spring are adapted to spring apart when withdrawn through said opening and wherein the base of said U-shaped spring is pivotally connected to said volute portion of said helical spring, said arrangement being such that said U-shaped spring is operative upon its withdrawal from said opening to resiliently hold said helical spring in collapsed condition.

10. The invention as claimed in claim 8, wherein the arms of said U-shaped spring are inwardly adjacent said cylindrical portion of said helical spring, the base of said U-shaped spring is outwardly adjacent said volute convergent portion of said helical spring, and said base is formed with a central loop which is forced through a central volution of said volute convergent portion to effect a pivotal connection.

11. The invention as claimed in claim 8, wherein said light mounting means comprise a support plate having tongues adapted to cooperate with tongues on said ring to provide a clamp connection, and wherein said envelope and bag are formed at said opening with a neck portion clamped between said support plate and ring.

References Cited in the file of this patent

UNITED STATES PATENTS

| | | |
|---|---|---|
| 569,556 | Greenard | Oct. 13, 1896 |
| 1,639,493 | Fischer | Aug. 16, 1927 |
| 1,858,991 | Frost | May 17, 1932 |
| 2,078,707 | Braunschweig | Apr. 27, 1937 |
| 2,517,197 | Gill | Aug. 1, 1950 |
| 2,673,285 | Buschi | Mar. 23, 1954 |

FOREIGN PATENTS

| | | |
|---|---|---|
| 2,634 | Great Britain | 1887 |
| 229,864 | Germany | Jan. 9, 1911 |
| 193,460 | Switzerland | Oct. 15, 1937 |